United States Patent [19]

Strait

[11] Patent Number: 4,778,316
[45] Date of Patent: Oct. 18, 1988

[54] PORTABLE KEYMILL

[75] Inventor: David S. Strait, Newberg, Oreg.

[73] Assignee: Climax Portable Machine Tools, Inc., Newberg, Oreg.

[21] Appl. No.: 33,515

[22] Filed: Apr. 1, 1987

[51] Int. Cl.⁴ .............................................. B23C 3/30
[52] U.S. Cl. ................................... 409/177; 409/178; 409/184
[58] Field of Search ................. 279/7, 8, 83; 409/177, 409/178, 232, 234, 181, 182, 184, 214

[56] References Cited

U.S. PATENT DOCUMENTS

| | | | |
|---|---|---|---|
| 828,948 | 8/1906 | Matheus | 409/177 |
| 1,532,650 | 4/1925 | Brewer | 409/177 |
| 2,373,341 | 4/1945 | Rowe | 409/177 |
| 2,602,375 | 7/1952 | Holt | 409/177 |
| 3,281,157 | 10/1966 | Hendrickson | 279/83 |
| 3,466,972 | 9/1969 | Strait | 409/177 |
| 4,533,284 | 8/1985 | Agius et al. | 408/92 |

*Primary Examiner*—Gil Weidenfeld
*Assistant Examiner*—Daniel W. Howell
*Attorney, Agent, or Firm*—Dellett, Smith-Hill and Bedell

[57] ABSTRACT

An improved portable milling machine adapted to grip a work piece and to cut a keyway through a clamping area. This is accomplished without releasing the grip of the milling machine on the work piece by forming an elongated slot in a bed plate with lands lying at opposite sides of the elongated slot. A clamp plate is arranged in stacked alignment with said lands and a work piece is gripped between the clamp plate and the lands of the bed plate. This structure permits a cutting element to pass through the elongated slot to cut a keyway upon the work piece while said work piece is gripped, the cutting action being performed through the clamped area. Improvements include interchangeable spindle construction allowing the use of a variety of cutter elements.

18 Claims, 3 Drawing Sheets

PORTABLE KEYMILL

BACKGROUND OF THE INVENTION

The present invention relates to milling machines and in particular to improvements in the field of portable key mills.

Portable keymills are used to cut a keyway or elongated slot in a shaft or other work piece while the shaft or work piece remains mounted on a machine. Without a portable keymill, the machine would have to be dismantled in order to remove the shaft for milling elsewhere. In most cases the keyway is cut in the exposed end of a shaft and extends along the length thereof a relatively short distance, approximately six inches or less. The function of a keyway is to receive a key or peg which extends above the surface of the shaft and into a second keyway in an article to be attached to the shaft, the key preventing rotation of the article about the shaft.

Portable keymills presently available are excessively complex in design and manufacturing cost and lack several desirable features. U.S. Pat. No. 3,466,972 entitled "Portable Milling Machine", discloses a portable milling machine adapted to grip the end of a work piece and cut a keyway along the length of the work piece. A bifurcated bed plate having lands on the underside thereof defines a cutting way and receives a work piece held against the lands by a clamp plate. A cutter head is slidable upon the bed plate and includes a motor driven cutter element extending into the cutting way and contacting the workpiece thereunder. As the cutter head slides upon the bed plate, the cutter element forms the keyway along the length of the workpiece. A horizontal lead screw, used to control horizontal motion of the cutter head, is driven via mitre gears by a vertical rod. The lead screw is threadably engaged to a lead screw nut which must be coupled, during manufacture, to the bed plate. A spindle, rotatably supported within a quill, requires two sets of bearings within the quill in order to support both ends of the spindle. A motor, sidemounted next to the quill housing, employs a gear box to deliver its torque to the spindle, and the spindle is permanently pressed into the quill housing.

SUMMARY OF THE INVENTION

The present invention relates to improvements in the design of portable keymills incorporating simpler design and resulting in reduced manufacturing cost while providing a keymill capable of performing the necessary milling operations while providing several features not previously available. A spindle is threaded directly to the motor drive shaft to eliminate the need for a gear box and a set of bearings at the proximal end of the spindle. The spindle may be easily removed for adaptation to different cutting elements. A horizontal lead screw is threadably engaged with a portion of a bed plate eliminating the need for affixing a nut to the bed plate, and a motor is clamped to a quill housing in a simplified manner allowing the incorporation of a vertical feed screw. The aforementioned improvements result in a more reliable and economical keymill.

It is accordingly an object of the present invention to provide an improved portable milling machine which is simpler in design and less expensive to manufacture than machines previously available.

It is a further object of the present invention to provide an improved portable milling machine having interchangeable spindles to accommodate various cutter element diameters without the use of special collets.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DRAWINGS

DETAILED DESCRIPTION

Figure 1:
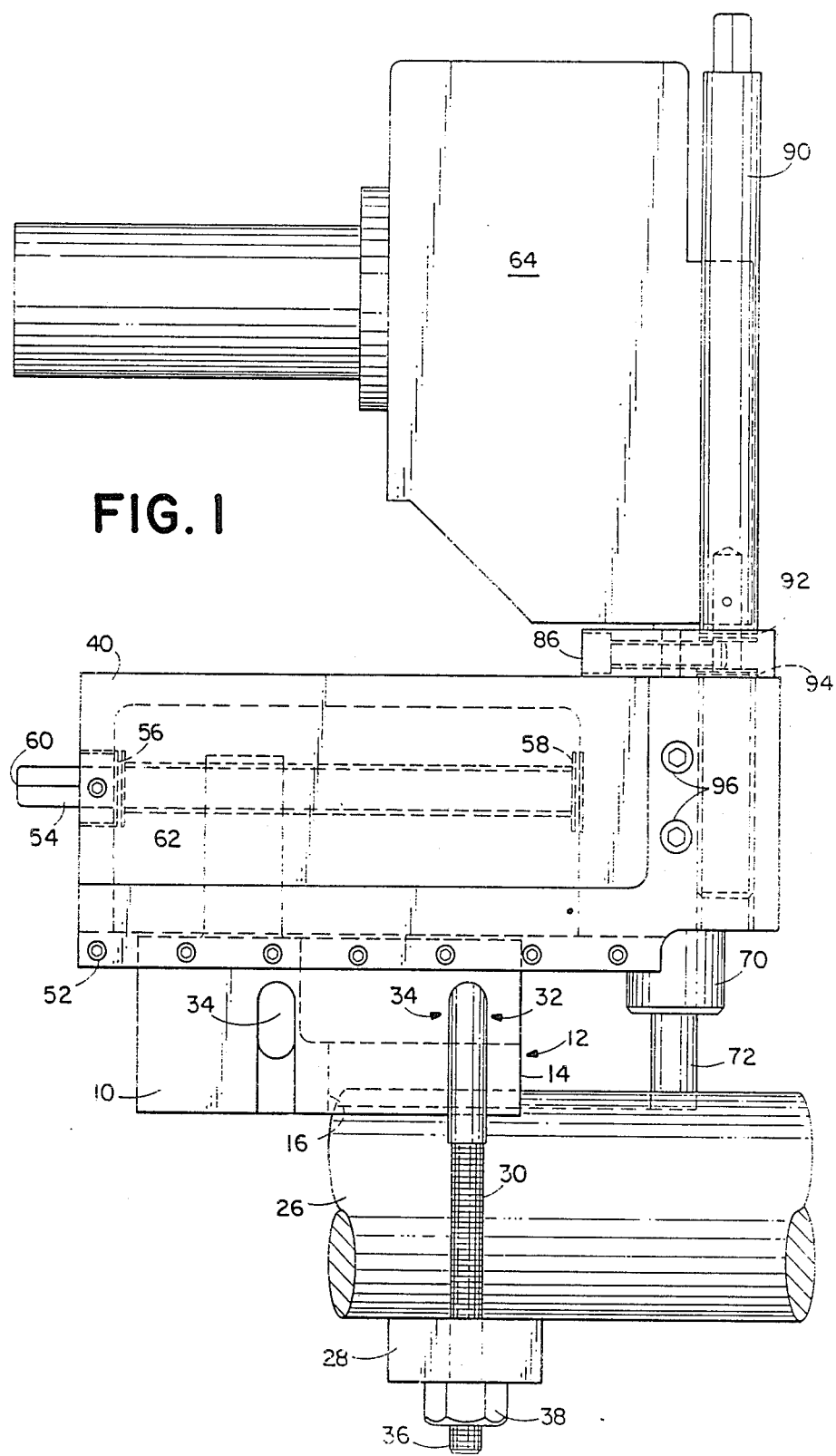
FIG. 1 illustrates a side view of a portable milling machine according to the present invention.
Figure 2:
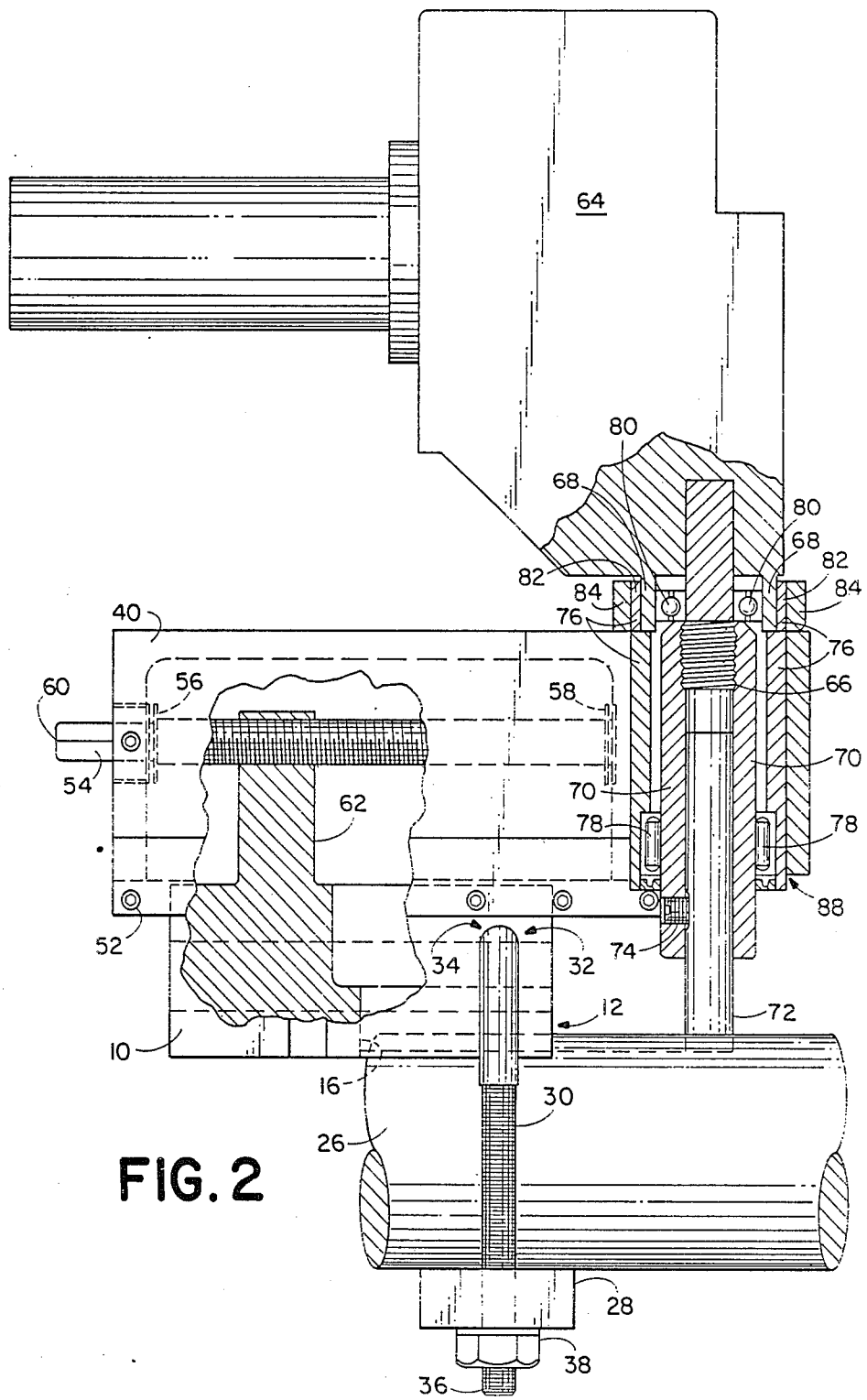
FIG. 2 is a partially cut away side view of the portable milling machine of FIG. 1.
Figure 3:
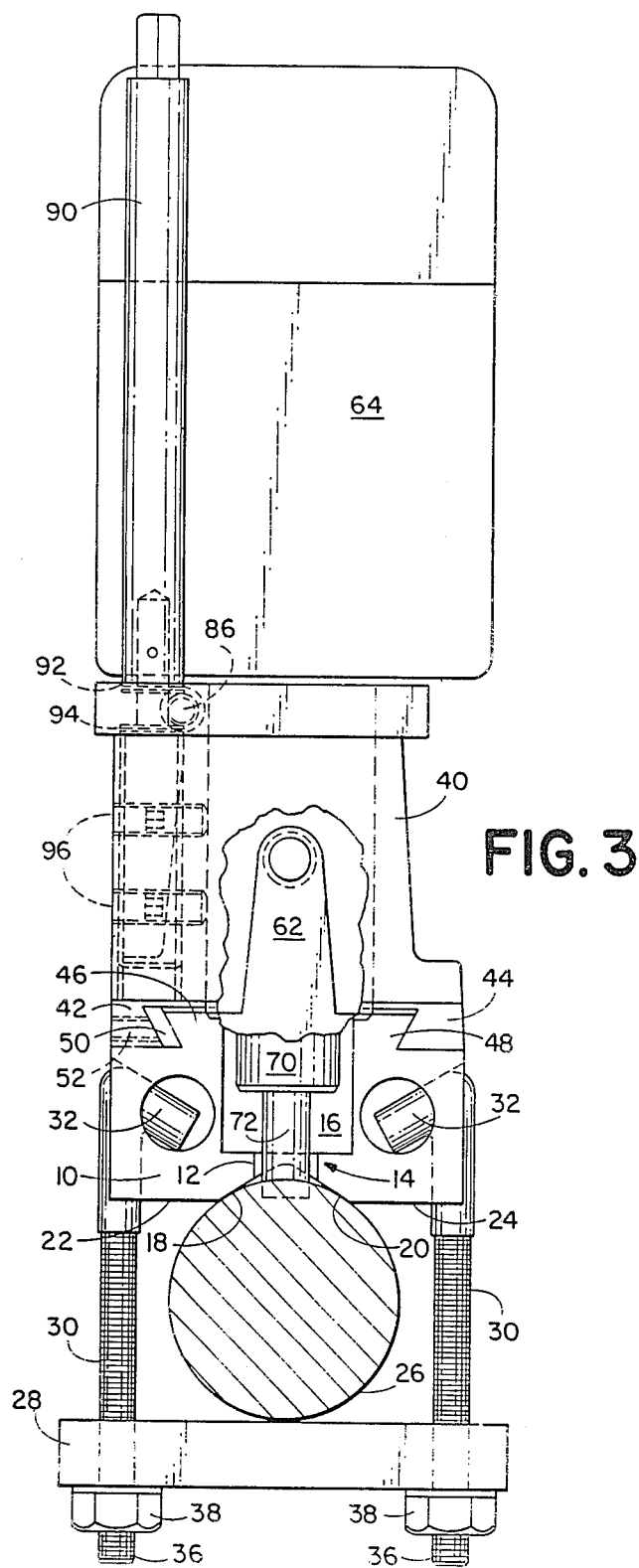
FIG. 3 is an end view partially cut away of the portable milling machine of FIG. 1.

In reference to FIGS. 1-3, a portable milling machine according to the present invention comprises a bifurcated bed plate 10 defining an elongated cutting way 12 intermediate the bifurcated portions thereof. Cutting way 12 has an open end 14 and a closed end 16. The undersurface of bed plate 10 includes upwardly inclined lands 18 and 20 each extending the length of the bed plate and adapted to receive a cylindrical elongate object such as a shaft. Lying outside lands 18 and 20 are flat horizontal sections 22 and 24 adapted to receive a flat work piece. A shaft 26 is held against bed plate 10 by means of a clamp plate 28 underlying shaft 26 in combination with bolts 30 having hooked sections 32 disposed within pockets 34 formed in bed plate 10 and having threaded sections 36 extending through clamp plate 28 and receiving threaded nuts 38 thereon. By tightening threaded nuts 38, shaft 26 is secured against bed plate 10. In the case of a cylindrical work piece such as shaft 26, lands 18 and 20 align shaft 26 with cutting way 12. Extra pockets 34 are available to be used in conjunction with additional clamp plates (not shown) if sufficient length of the work piece is available for gripping. An alternative means (not shown) for securing work piece 26 against bed plate 10 comprises a linked chain having hooked ends insertable within pockets 34, the hooked ends being adjustable along the length of the linked chain so as to tighten the linked chain against the work piece.

A cutter head 40 has rails 42 and 44 on its underside which engage complementary rails 46 and 48 on the upperside of bed plate 10, rail 42 facing rail 46 and rail 44 facing rail 48 with each pair in a dovetail or interlocking relation. The function of rails 42, 44, 46, and 48, as best viewed in FIG. 3, is to allow cutter head 40 to slide horizontally atop bed plate 10 along the line of the cutting way while resisting vertical forces. To prevent separation of the bifurcated portions of bed plate 10 as shaft 26 is forced against bed plate 10, rails 46 and 48 of bed plate 10 should be interior to rails 42 and 44 of cutter head 40. A shim 50, disposed between rail 42 and rail 46 and secured therein by set screws 52, is removed to provide sufficient space to lift cutter head 40 away from bed plate 10 without having to slide cutter head 40 off an end of bed plate 10.

A horizontal lead screw 54 is rotatably supported upon cutter head 40 by thrust bearings 56 and 58 and lies along the length of cutter head 40 parallel to cutting way 12 with an end 60 extending beyond cutter head 40, end 60 adapted to receive a handle (not shown) for turning screw 54. Extending upwardly from bed plate 10 and integral therewith is a fixed nut 62 threadably engaging horizontal feed screw 54. Fixed nut 62 is formed from the same block as bed plate 10 in order to reduce manufacturing complexity and expense. To move cutter head 40 atop bed plate 10, horizontal lead screw 54 is rotated by an operator.

As best viewed in FIG. 2, a motor 64 having a threaded motor shaft 66 extending from a motor boss 68 receives a spindle 70 which is threadable upon motor shaft 66. Spindle 70 supports a cutting element 72 held therein by set screw 74. Spindle 70 is disposed within a quill housing 76 having quill bearings 78 rotatably supporting the distal end of spindle 70, the proximal end of the structure being rotatably supported by motor bearings 80 within motor boss 68. An upper end of quill housing 76 comprises a quill flange 82 dimensioned to receive motor boss 68 while a boss clamp 84 secures quill flange 82 to motor boss 68 by means of a set bolt 86 (FIG. 1). Quill housing 76 is slidably disposed within a vertical quill bore 88 in cutter head 40. Vertical motion of boss clamp 84, including motor 64 and quill housing 76, with respect to cutter head 40 is equivalent to vertical motion of cutter element 72 with respect to shaft 26.

A vertical feed screw 90 is rotatably supported by thrust bearings 92 and 94 within boss clamp 84 and threadably engages cutter head 40. Rotation of vertical feed screw 90 causes relative motion of boss clamp 84 with respect to cutter head 40 thereby accomplishing the ultimate objective of adjustment of cutter element 72 depth within shaft 26. When the vertical position of cutter element 72 is at the proper depth, set screws 96, threaded within cutter head 40 and extending into quill bore 88, are rotated to contact quill housing 76 and lock the vertical position of cutter element 72.

To operate the portable keymill on shaft 26 to form a keyway along the length thereof, bed plate 10 is placed upon the the upper side of shaft 26 with cutting way 12 directly above the location of the desired keyway. Clamp plate 28 is positioned below shaft 26 and hooked sections 32 of bolts 30 are placed in pockets 34 while the threaded sections 36 of bolts 30 are extended through clamp plate 28. Threaded nuts 38 are tightened to bring clamp plate 28 against shaft 26 and force shaft 26 against lands 18 and 20. Initially, closed end 16 of cutting way 12 should be beyond the end of shaft 26 (not shown) so as to allow cutting element 72 to be brought below the surface of shaft 26, by rotation of vertical feed screw 90, to the desired depth of cut whereupon set screws 96 are tightened to lock quill housing 76 in place. Motor 64 is engaged to activate cutting element 72 and horizontal feed screw 54 is rotated to move cutting element 72 into shaft 26 and thereby form the keyway. If the range of horizontal motion is insufficient, then bed plate 10 may be re-clamped further along shaft 26 to continue the cut.

The present disclosure includes several significant features previously unavailable in portable keymills. Because spindle 70 is interchangeable it is possible to easily accommodate cutting elements of various diameters, including both metric and conventional cutting elements. Spindle 70 is capable of receiving double ended cutting elements because the bore in the spindle is full length. This device may be more economically manufactured due to simplicity of design relative to previous designs. The method of clamping quill housing 76 to motor boss 68 is simpler. Vertical feed screw 90 is incorporated into the boss clamp. Forming fixed nut 62 from the same block as that of bed plate 10 is less difficult than attaching a nut to bed plate 10 during manufacture.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A portable milling machine comprising:
   a cutter head slidable along a feed path;
   a cutter drive means slidable with respect to said cutter head along a line having a component perpendicular to said feed path, said cutter drive means including motor means provided with a motor shaft and bearing means for rotatably supporting said motor shaft;
   a quill member and means for clamping said quill member to said motor means while coaxially receiving an end of said motor shaft;
   a spindle removably engagable with said end of said motor shaft, wherein said quill member is further provided with second bearing means for rotatably supporting said spindle, said spindle being adapted to receive a cutter; and
   a vertical feed screw coupling said clamping means and said cutter head, wherein said clamping means and said cutter head are coupled elements and said coupling is accomplished by rotatably supporting said vertical feed screw with one coupled element while threadably engaging said vertical feed screw with the other coupled element.

2. A portable milling machine adapted to be clamped directly to a fixed work piece, comprising:
   a bed plate defining an elongated cutting way between bifurcated portions having clamping lands for engaging the work piece;
   securing means for securing said work piece against said clamping lands;
   a cutter head slidable on the bed plate along a line defining a feed path;
   a power driven cutter means supported by said cutter head, said cutter means including motor means provided with a motor shaft and bearing means for rotatably supporting said motor shaft;
   a quill member and means for clamping said quill member to said motor means while coaxially receiving an end of said motor shaft;
   a spindle removably engagable with said end of said motor shaft, wherein said quill member is further provided with second bearing means for rotatably supporting said spindle, said spindle being adapted to receive a cutter; and
   a vertical feed screw rotatably supported by said clamping means, said feed screw being threadably engaged with said cutter head for relatively moving said quill member with respect to said bed plate.

3. A portable milling machine according to claim 2, wherein said clamping lands extend substantially along the length of said bed plate.

4. A portable milling machine according to claim 2, wherein said clamping lands include upwardly inclinded portions adapted to receive a work piece of cylindrical cross section.

5. A portable milling machine according to claim 2, wherein said clamping lands include flat portions adapted to receive a work piece having a flat surface.

6. A portable milling machine according to claim 2, wherein said cutter head includes cutter head rails; said bed plate includes bed plate rails; and said bed plate rails are interlocked with said cutter head rails and cooperate to resist motion of said cutter head in any direction other than along said feed path.

7. A portable milling machine according to claim 6, wherein said bed plate rails are interior to said cutter head rails.

8. A portable milling machine according to claim 2, wherein said quill member is cylindrical.

9. A portable milling machine according to claim 2, wherein said securing means comprises:
- a clamp plate having holes therein;
- a plurality of bolts, said bolts each having a hooked end and a threaded end, said threaded end insertable within said holes in said clamp plate;
- a plurality of threaded nuts, said threaded nuts threadable upon said threaded end of members of said plurality of bolts; and
- said bed plate having pockets therein for receiving said hooked ends of members of said plurality of bolts.

10. A portable milling machine according to claim 2, including a lead screw nut, said lead screw nut being attached to said bed plate; and a horizontal lead screw rotatably supported by said cutter head, said lead screw being threadably engaged with said lead screw nut.

11. A portable milling machine according to claim 10, wherein said lead screw nut is a threaded portion of said bed plate.

12. A portable milling machine adapted to be clamped directly to a fixed work piece, comprising:
- a bed plate defining an elongated cutting way between bifurcated portions having clamping lands substantially along the length thereof for engaging the work piece;
- securing means for securing said work piece against said clamping lands;
- a cutter head with interlocking rail members slidably mating with rails on the bed plate and defining with said rails a feed path;
- a power driven cutter means supported by said cutter head, said cutter means including motor means provided with a motor shaft and bearing means for rotatably supporting said motor shaft;
- a cylindrical quill member and means for clamping said quill member to said motor means while coaxially receiving an end of said motor shaft;
- a spindle removably engagable with said end of said motor shaft, wherein said quill member is further provided with second bearing means for rotatably supporting said spindle, said spindle being adapted to receive a cutter; and
- a vertical lead screw rotatably supported by said clamping means, said lead screw being threadably engaged with said cutter head for relatively moving said quill member with respect to said bed plate.

13. A portable milling machine according to claim 12, wherein said securing means comprises:
- a clamp plate having holes therein;
- a plurality of bolts, said bolts each having a hooked end and a threaded end, said threaded end insertable within said holes in said clamp plate;
- a plurality of threaded nuts, said threaded nuts threadable upon said threaded end of members of said plurality of bolts; and
- said bed plate having pockets therein for receiving said hooked ends of members of said plurality of bolts.

14. A portable milling machine according to claim 12, including a lead screw nut, said lead screw nut being attached to said bed plate; and a horizontal lead screw rotatably supported by said cutter head, said lead screw being threadably engaged with said lead screw nut.

15. A portable milling machine according to claim 14, wherein said lead screw nut is a threaded portion of said bed plate.

16. A portable milling machine comprising:
- a cutter head slidable along a feed path;
- a cutter drive means slidable with respect to said cutter head along a line having a component perpendicular to said feed path, said cutter drive means including motor means provided with a motor shaft and bearing means for rotatably supporting said motor shaft;
- a quill member and means for clamping said quill member to said motor means while coaxially receiving an end of said motor shaft; and
- a vertical feed screw coupling said clamping means and said cutter head, wherein said clamping means and said cutter head are coupled elements and said coupling is accomplished by rotatably supporting said vertical feed screw with one coupled element while threadably engaging said vertical feed screw with the other coupled element.

17. A portable milling machine according to claim 16 further comprising:
- a bed plate defining an elongate cutting way between bifurcated portions having clamping lands for engaging a work piece, said cutter head being slidable on said bed plate; and
- securing means for securing said work piece against said clamping lands.

18. A portable milling machine according to claim 17, wherein said securing means comprises:
- a clamp plate having holes therein;
- a plurality of bolts, said bolts each having a hooked end and a threaded end, said threaded end insertable within said holes in said clamp plate;
- a plurality of threaded nuts, said threaded nuts threadable upon said threaded end of members of said plurality of bolts; and
- said bed plate having pockets therein for receiving said hooked ends of members of said plurality of bolts.

* * * * *